United States Patent

[11] 3,548,963

| [72] | Inventor | Erwin D. Schlaphoff |
| | | P. O. Box 2197, San Ysidro, Calif. 92073 |
| [21] | Appl. No. | 695,111 |
| [22] | Filed | Jan. 2, 1968 |
| [45] | Patented | Dec. 22, 1970 |

[54] PORTABLE MOTOR VEHICLE
8 Claims, 11 Drawing Figs.

[52] U.S. Cl........................................ 180/32,
280/278, 280/284; 74/551.3
[51] Int. Cl........................................ B62m 25/04
[50] Field of Search............................ 180/32, 33;
280/284, 278, 287; 74/551.3

[56] References Cited
UNITED STATES PATENTS

| 2,243,124 | 5/1941 | Rockola............ | 180/33 |
| 2,604,336 | 7/1952 | Seddon et al.......... | 280/284 |
| 2,696,272 | 12/1954 | Schlaphoff............ | 180/33 |
| 2,839,146 | 6/1958 | Bouffort............... | 180/32X |
| 2,910,130 | 10/1959 | Schlaphoff............ | 180/33 |

Primary Examiner—Kenneth H. Betts
Attorney—Warren H.F. Schmieding

ABSTRACT: A portable motor vehicle of the type in which the rear wheel is pivotally carried by a lever on a vehicle frame, the frame being supported through a guided spring and linkage including an arm, pivotally connected with the lever and the guide, the linkage including an abutment which can be moved into and out of resting position on the lever. The vehicle also includes a front frame which is pivotally connected with the aforementioned frame; it carries handle bars and folds within the aforementioned frame. The front frame carries a removable fork and wheel assembly, which is receivable by the rear frame, and the handle bars are movable to a more compact position.

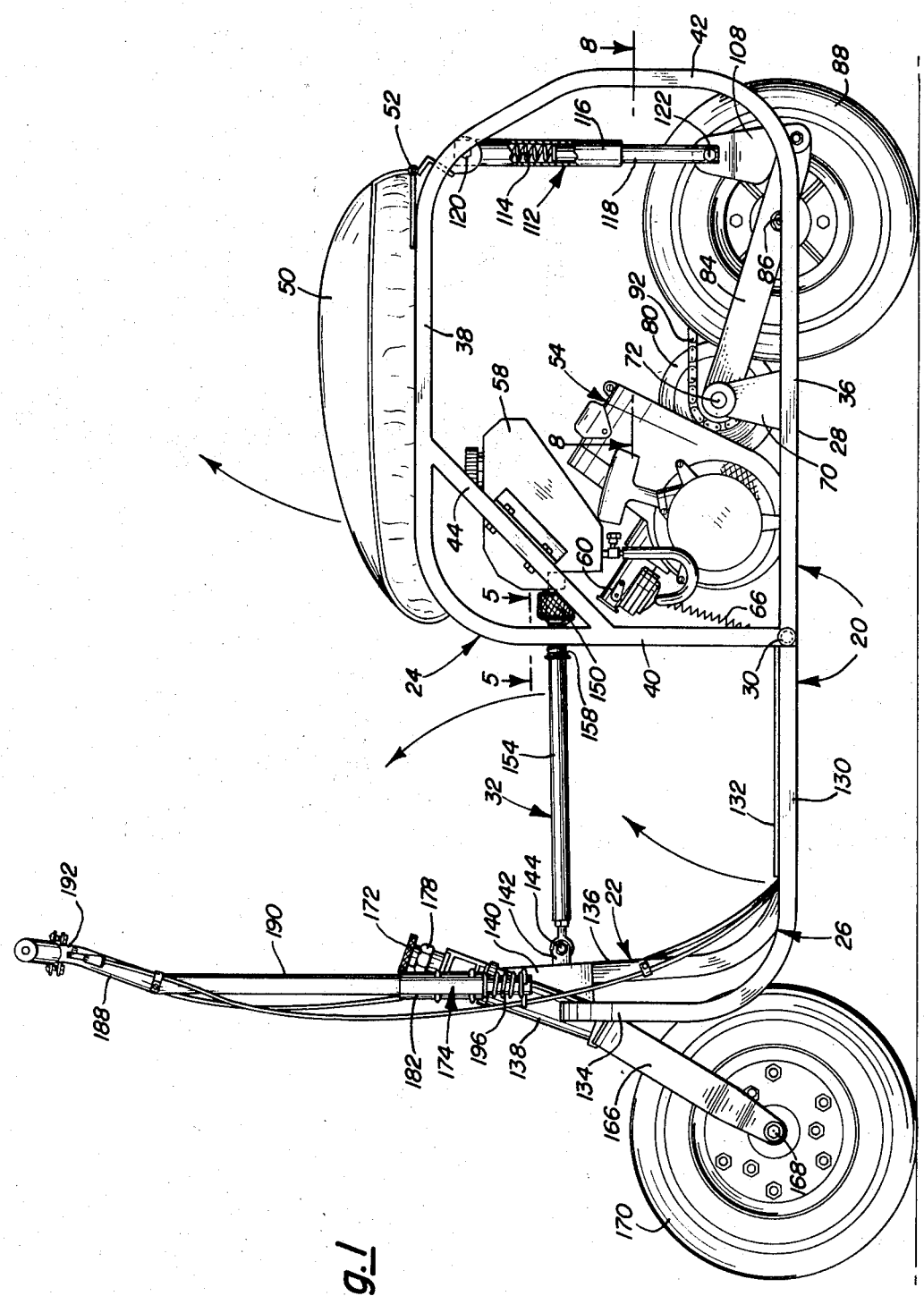

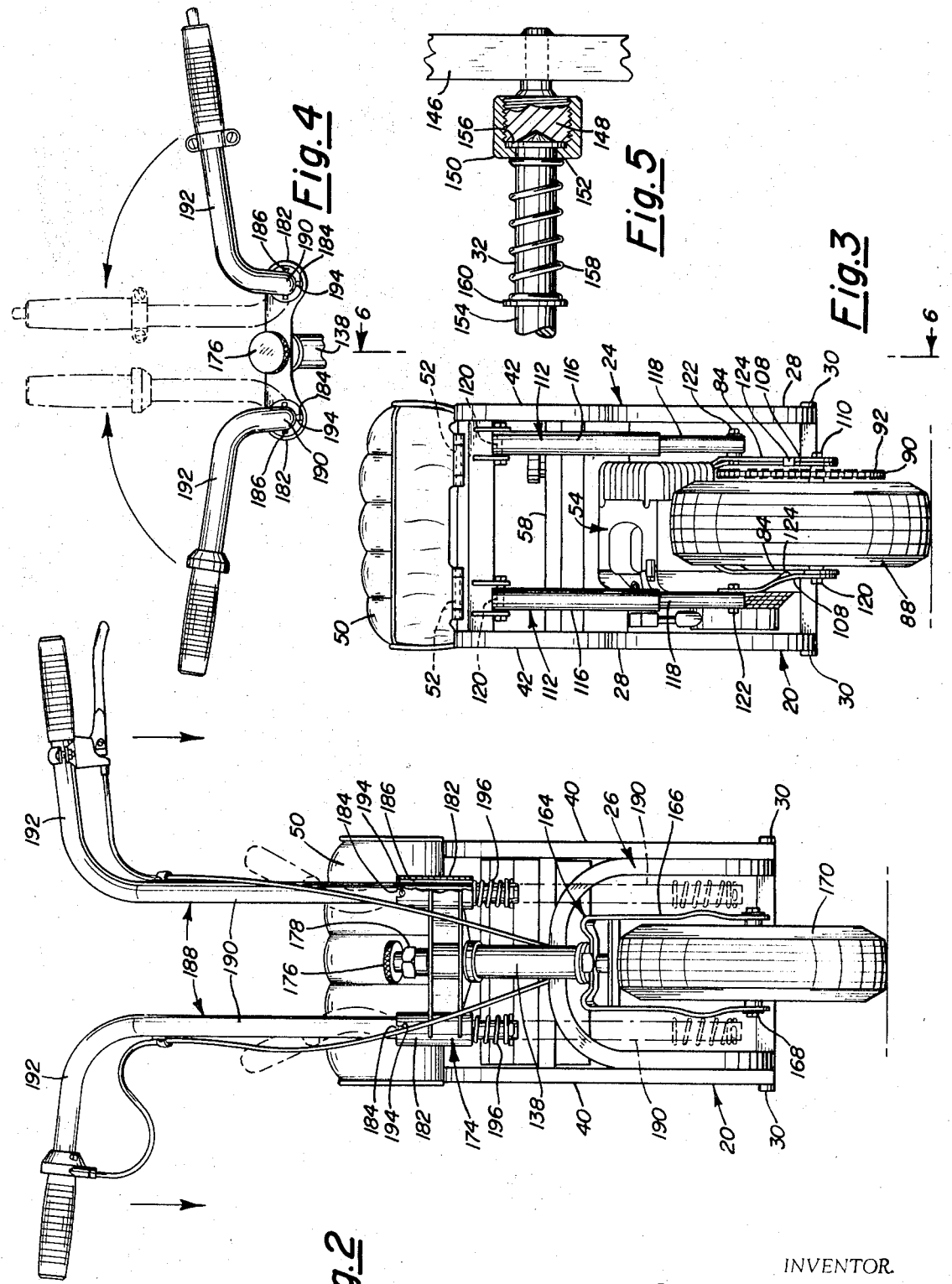

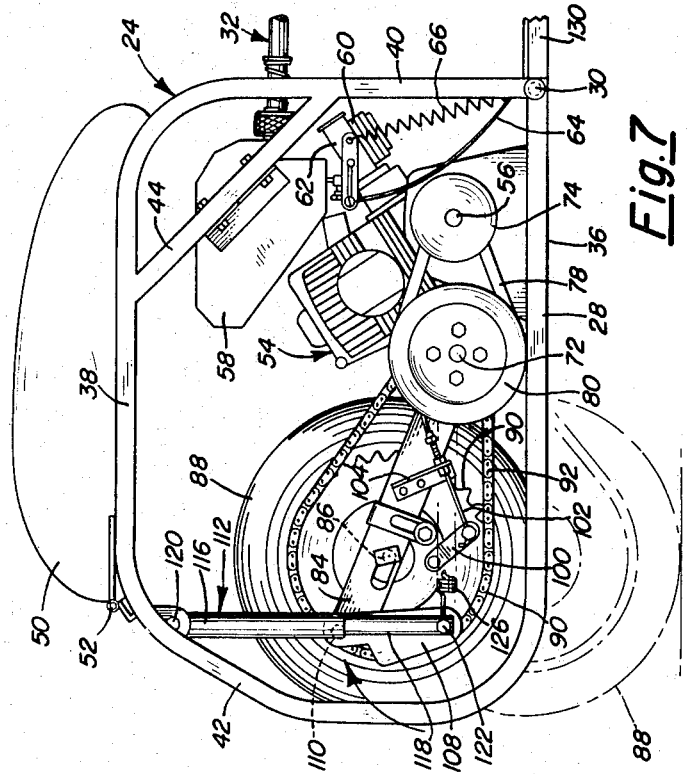

PATENTED DEC 22 1970　　　　　　　　　3,548,963
SHEET 4 OF 4
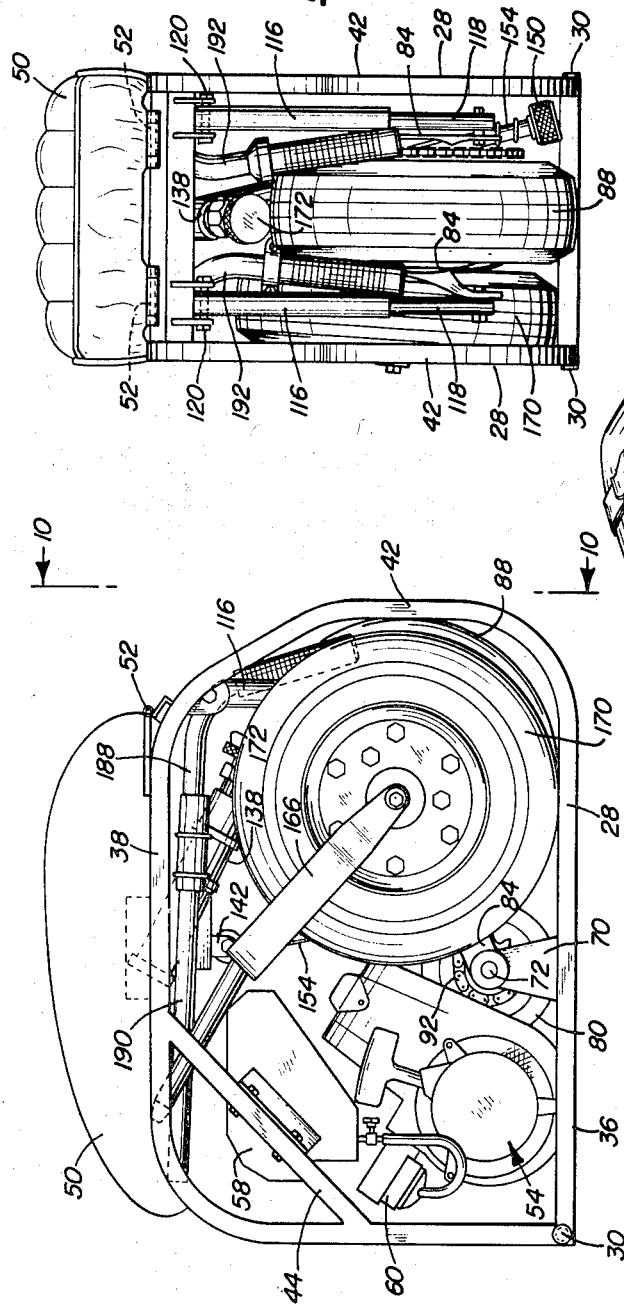
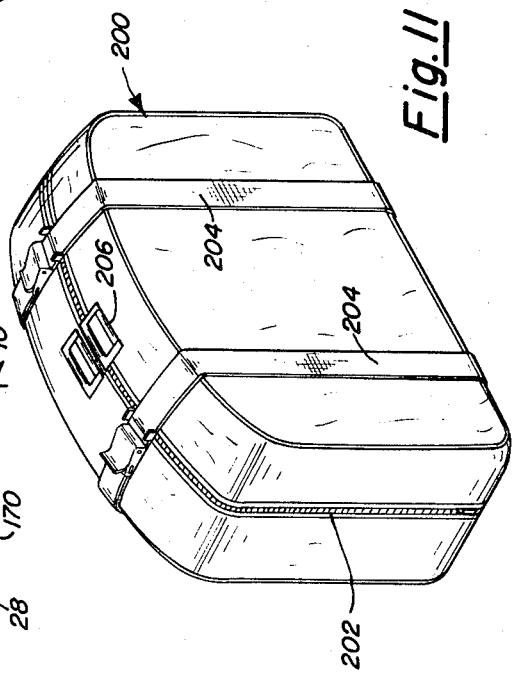
INVENTOR.
ERWIN D. SCHLAPHOFF
BY
*Warren H. F. Schmierer*
ATTORNEY

PORTABLE MOTOR VEHICLE The present invention is directed to various improvements to my U.S. Pat. No. 2,696,272, issued Dec. 7, 1954 and U.S. Pat. No. 2,910,130, issued Oct. 27, 1959, wherein the compact portable motor vehicle comprises a rear frame and a front frame, which can be removed from and stored within the confines of the rear frame.

Specifically, the invention is directed to an improved mounting between the rear, ground engaging driving wheel and the rear frame. The motor, herein shown for illustrative purpose only, is an internal combustion engine. It is carried directly by the rear frame. The rear wheel is journaled for rotation on a lever, the front end of the lever being pivotally connected with the rear frame. Resilient means, in the form of a spring, is connected between the frame and the lever.

As a further improvement, guiding mechanism is provided for the spring. One end of the guiding mechanism is pivotally connected with the frame, and the other end is connected with an arm. The arm is connected with the lever and is movable to an over center position in which the abutment rest on the lever for holding the frame in a raised position, i.e., the position in which the frame is mobile, and the arm can be moved to a position in which the frame can be lowered to ground level.

Further, the front frame includes a vertically extending bearing for the spindle of a fork and front wheel assembly, and also includes at least one sleeve and preferably two sleeves. Each of these sleeves is provided with at least one socket in the top thereof and a longitudinally extending groove. Each sleeve receives a handle bar and the bar is provided with a pin, which rest in the socket to thereby provide movement by the handle bar to the sleeve and consequently the front fork and wheel assembly. A spring normally yieldingly urges the pin within the socket.

The bar and pin can be lifted to remove the pin from the socket and then turned so that the pin can be received by the groove, whereby the handle bar can be lowered to alongside of the fork and wheel assembly.

Other features and the advantages of the present invention will be apparent from the following description, reference being had to the accompanying drawings wherein a preferred embodiment of the invention is illustrated.

IN THE DRAWINGS

FIG. 1 is a left side view of the portable motor vehicle, part of the spring guide being shown in section;

FIG. 2 is a front view of the vehicle;

FIG. 3 is a rear view of the vehicle;

FIG. 4 is a top plan view of the handle bars and the sleeves of the front frame;

FIG. 5 is a fragmentary sectional view taken along line 5–5 of FIG. 1, but on a larger scale;

FIG. 6 is a right side view of the rear section of the vehicle, part of the frame being removed, and also showing the lower section of the front frame and part of the stabilizing connection between the front and rear frames;

FIG. 7 is s view similar to FIG. 6, but showing the bottom of the rear frame lowered to ground engagement;

FIG. 8 is a fragmentary view looking in the direction of arrows 8 in FIG. 1, the upright portion of the rear frame being shown in section;

FIG. 9 is a left side view of the vehicle, but showing the front section confined in the rear section;

FIG. 10 is a view looking in the direction of arrows 10 of FIG. 9; and

FIG. 11 is a perspective view of the carrying case for the vehicle.

Referring more in detail to the drawings, the portable motor vehicle 20 includes a front section 22 and rear section 24. The front section includes a main frame 26 and the rear section includes a main frame 28. These sections are hingedly attached to one another by a pivot or pivots 30, and are stabilized in there connected position by a stabilizer 32.

The rear frame 28 is formed of tubing including spaced horizontally extending lower sections 36, which are spaced from one another and like sections 38 are connected with one another by front vertically extending portions 40 and rear vertically extending portions 42. The portions 40 are also connected with the portions 38 by braces 44. As shown in FIG. 8, the lower portions 36 are interconnected by bracing portions 46. A seat 50 rests upon the upper portions 38 and are hinged by pins 52 to the rear of portions 44, whereby the seat may be raised.

A motor 54 is fixed to the frame portions 28 and is herein shown for illustrative purpose only as an internal combustion engine. The drive shaft is shown at 56, the fuel tank at 58, the carburetor at 60, the lever for actuating the throttle valve at 62 and the bowden wire for actuating the lever at 64. A spring 66 normally maintains the throttle valve in the closed position.

A pair of upright bearing supports 70 are also carried by the lower portions 36 of the frame 28 and the disposed rearwardly of the motor 54. These bearing supports carry a shaft 72 whose axis is parallel with the axis of the engine drive shaft 56. The shaft 56 drives a speed control clutch 74 which in turns drives a pulley 76 which is rotatably mounted on the shaft 56. The pulley 76 is connected by a belt 78 with a pulley 80 which is fixed to the shaft 72. When the motor 54 is driven at a certain speed and above that certain speed, the pulley 80 is rotated.

Lever means in the form of two levers 84 are pivotally mounted on the shaft 72. These levers 84 extend rearwardly and carry an axle 86 of a wheel 88, the axis of which lies parallel with that of the shaft 56 of the motor. As is seen more clearly in FIGS. 6 and 7, the wheel includes a tooth gear 90, which is connected by a chain 92 to a gear 94 which is fixed to the shaft 72. It will be seen from the foregoing, that when the engine is operated at or above the predetermined speed, the wheel 88 will be driven to cause forward movement of the vehicle, when the frame is locked in the position shown in FIGS. 1 and 6. The braking mechanism is shown generally at 98, which is operated by a lever 100 from a bowden wire 102 which is carried by a bracket 104 on one of the levers 84.

The rear frame 28 together with the motor 54, and the seat 50 are locked in elevated position by a pair of arms 108, which are connected to the rear ends of levers 84 by pivot pins 110. Two spring retainers 112 are provided for coil springs 114. Each retainer includes a cylinder 116, which receives a plunger 118. The springs are interposed between the tops of plungers 118 and abutments (NOT SHOWN) in the upper part of the cylinders 116. The upper parts of the cylinders 116 are pivotally connected by pins 120, in any suitable manner, to the rear portions 42 of the frame. The lower parts of the plungers 118 are connected by pins 122 to the arms 108. Each of the arms 108 is provided with an abutment 124 which, when the frame is in the position shown in FIGS. 1 and 6 rests upon a lever 84. It will be observed from FIG. 6 that the pivot pins 122 are in an overcenter position, when the arms 108 are in frame elevating position, i.e., the pivots 122 lie forwardly of a line intersection pivot pins 120 and 110. As shown in FIG. 6, the arms 108 must be moved a considerable distance counterclockwise before pivot pins 122 are moved rearwardly beyond the aforesaid line. Thus, stability is assured. However, to further assure the stability two springs 126 are provided for resiliently retaining the arm 108 and the spring guide 112 in the position shown in FIGS. 1 and 6. Each of the springs 126 is connected at one end to a lever 84 and the other end is connected to the pivot 122. From the foregoing, it will be seen that with the arms 108 and the spring guide 112 in the position shown in FIGS. 1 and 6, the springs 114 form shock absorber since they resiliently support the rear end of the frame 28.

When it is desired to lower the rear frame 28, the arms 108 are moved counterclockwise (as viewed in FIG. 6) approximately 180°, i.e., to the position shown in FIG. 7. At this time the entire rear wheel will be confined within the frame 28, as shown in FIG. 7. It is also apparent from FIG. 7 that when the rear wheel is confined within the frame 28, the pivot pin 110, which connects the lever 84 with the arm 108, is in toggled relationship with respect to the pivot pins 120 and 122 whereby the rear wheel is held in position within the confines of the frame.

Referring now to FIGS. 1, 2, 4 and 5, the front frame 26 includes opposite frame portions 130, the rear ends of which are pivoted to the front ends of portions 28 of the rear frame. These portions 130 are bridged by a footboard 132. The frame 26 also includes upright portions 134 and 136, which supports a vertically extending bearing 138 and a central portion 140. This central portion includes a rearwardly extending boss 142 for supporting a pivot pin 144 for the stabilizer 32.

Referring to FIG. 5, it will be seen that the rear end of the stabilizer 32 is connected to a brace 146 which spans the uprights 40 of the rear frame. This connection include a threaded stud 148, which is welded to the brace 146 and this stud 148 receives an internally threaded nut 150. The nut 150 include a circular inwardly extending flange 152, which surrounds the stabilizer rod 154 having a collar 156 interposed between the flange 152 and the outer end of the nut 150. A coil spring 158 surround a shaft 154 and is interposed between the front of the nut 150 and a fixed collar 160 on the rod 154. The purpose of this spring is to hold the flanges 152 and 156 in contact with one another, when the stabilizer is disconnected from the stud 148 so as to prevent rattling. By tightening the nut 150 on the stud 156, the upper part of the front frame 26 is rigidly connected with the upper part of the rear frame 28.

A front wheel fork and wheel assembly 164 includes a fork 166, which rotatably carries an axle 168 of the wheel 170. The assembly also includes a spindle 172 which is journaled in the usual manner in the bearing 138. The spindle is removably splined to a head 174 and fixed thereto by a screw 176, which is locked in position by a nut 178. By turning the head 174 the front wheel is also turned through the spindle 172.

The head 174 includes two vertically extending sleeves 182, each having a notch 184 and a longitudinally extending groove 186. This groove extends completely longitudinally through the sleeve. The front section includes two handle bars 188 including upwardly extending portions 190 and outwardly extending portions 192. The upright portions 190, each include a pin 194 which rest snugly within the socket 184 so as to provide driving connection between the handle bars and the sleeves 182 and consequently impart oscillating movement by the bar to the front wheel through the spindle. The pins 194 are resiliently held in the sockets 184, by springs 196 which are interposed between the bottom of the sleeve and pins extending through the lower ends of the upright portions 190 of the bars.

The usual encasements for bowden wires, for controlling the brake and controlling the accelerator, are shown as attached to the handle bars.

When it is desirable to dismantle the motor vehicle, the handle bars 188 are pulled upwardly so that the pins 194 can be pulled out of the sockets 184, and then the left handle bar (as shown in FIGS. 2 and 4) is moved clockwise so that the pin registers with the groove 186, as shown in these two FIGS. in dotted lines, whereby the handle bars can be lowered, the pin passing through the groove. Like movement is imparted to the right handle bar, but it is moved in a counterclockwise direction, as shown in dotted lines. The handle bars can be lowered to the position shown in dotted lines in FIG. 2. Thereafter, the lock nut 178 is released and the screw 176 is actuated to release the head 174 from the spindle 172, whereby the fork and wheel can be withdrawn from the bearing 138.

The dimensions of the rear frame are such that the handle bars and the head 174, as a unit, and the front fork assembly including the wheel 170 can be stored in that frame as is shown in FIGS. 9 and 10.

Preferably a casing 200 is provided for the disassembled unit, the same thing shown in FIG. 11. Zipper 202 and straps 204 are provided. This casing is provided also with handles 206.

From the foregoing, it is seen that I have provided a portable motor vehicle of the type that is sufficiently compactible and of such weight that a man can carry the same. The attaching of the rear wheel 88 to the rear frame 36 by the levers 84, the providing of the spring guide mechanism 112 and the connection thereof through the arms 108 to the levers 84, provide a shock absorber between the rear wheel and the frame, and in addition provide for readily lowering of the rear frame by merely rotating the arms 108 approximately 180°.

Wide handle bars are made possible by the collapsing feature illustrated.

I claim:

1. A portable motor vehicle, comprising in combination:
   A. a rear frame including:
      1. side frame members;
      2. a transversely disposed frame member secured to the side members;
   B. a motor carried directly by the frame;
   C. lever means disposed between the side members of the frame and extending rearwardly;
   D. means for pivotally connecting the front end of the lever means with the frame;
   E. a rear wheel having an axle supported by the lever means;
   F. a spring connected between the frame and the lever means;
   G. means for pivotally supporting the spring on the frame and for guiding the spring;
   H. an arm having:
      1. an abutment;
   I. means for pivotally connecting the arm with the lever means for movement to a position in which the abutment rests on the lever means, said arm being movable about the last mentioned means I to a position in which the abutment does not rest on the lever means; and
   J. means pivotally connecting the arm with the spring means F.

2. A portable motor vehicle as defined in claim 1, characterized to include:
   K. a spring normally urging the arm in the position in which the abutment rest on the lever means.

3. A portable motor vehicle as defined in claim 1, characterized in that the axes of the axle and the pivot means D, G, I and J are parallel.

4. A portable motor vehicle, comprising in combination:
   A. a rear frame including:
      1. side frame members;
      2. a transversely disposed frame member secured to the side members;
   B. a motor carried directly by the frame;
   C. lever means disposed between the side members of the frame and extending rearwardly;
   D. means for pivotally connecting the front end of the lever means with the frame;
   E. a rear wheel having an axle supported by the lever means;
   F. an arm having:
      1. an abutment;
   G. means for pivotally connecting the arm with the lever means for movement to a position in which the abutment rests on the lever means, said arm being movable about the last mentioned means G to a position in which the abutment does not rest on the lever means; and
   H. a spring connected with the frame and with the arm.

5. A portable motor vehicle as defined in claim 4, characterized in that the arm, when moving to the second mentioned position is swung about the pivoted end of the lever means.

6. A portable motor vehicle as defined in claim 4, characterized in that the said rear wheel extends below the side frame members when the abutment rests on the lever means, said rear wheel being movable within the confines of the frame when the arm is moved to the second mentioned position.

7. A portable motor vehicle as defined in claim 6, characterized in that when the arm is in the second mentioned position, a toggled relationship is established by the connection of the spring with the frame and with the arm for retaining the wheel within the confines of the frame.

8. A portable motor vehicle as defined in claim 4, characterized to include:
  I. an assembly including:
    1. a second frame;
    2. a vertically extending bearing carried by the second frame;
    3. a spindle journaled in the bearing;
    4. a front wheel journaled on the spindle;
    5. means for turning the spindle in the bearing including:
      a. a sleeve having:
        i. a socket;
        ii. a longitudinally extending groove in the sleeve;
      b. a handle bar extending to the sleeve and having:
        i. a pin attached thereto, said pin being adapted to be received by the socket and adapted to be moved from the socket into the groove;
  J. means for removably attaching the assembly to the rear frame to form said motor vehicle; and
  further characterized in that the assembly, when detached from the rear frame, can be placed within the confines of the rear frame.

UNITED STATES PATENT OFFICE
CERTIFICATE OF CORRECTION

Patent No. 3,548,963  Dated December 22, 1970

Inventor(s) ERWIN D. SCHLAPHOFF

It is certified that error appears in the above-identified patent and that said Letters Patent are hereby corrected as shown below:

Column 2, line 18, after "and" cancel "the" and substitute --are--;

Column 6, line 3, cancel "to" and substitute --into--.

SIGNED AND SEALED
MAR 9 1971

(SEAL)
Attest:

Edward M. Fletcher, Jr.
Attesting Officer

WILLIAM E. SCHUYLER, JR
Commissioner of Patents

FORM PO-1050 (10-69)